United States Patent [19]
Hoetzel

[11] 3,864,872
[45] Feb. 11, 1975

[54] FISHING GAME

[76] Inventor: John H. Hoetzel, 650 Americana Ave., Annapolis, Md. 21403

[22] Filed: Feb. 21, 1973

[21] Appl. No.: 334,428

[52] U.S. Cl. .................................. 46/241, 273/1 M
[51] Int. Cl. ............................................ A63h 33/26
[58] Field of Search.......... 46/51, 241, 40; 273/1 M; 294/65.5; 43/18, 20, 24

[56] References Cited
UNITED STATES PATENTS

| | | | |
|---|---|---|---|
| 2,623,774 | 12/1952 | Hubbard | 46/40 X |
| 2,747,872 | 5/1956 | Marvey | 273/1 M |
| 2,947,108 | 8/1960 | Dodd, Jr. et al | 46/51 |
| 3,279,116 | 10/1966 | Chapman | 43/24 X |
| 3,463,494 | 8/1969 | Strott | 46/241 X |
| 3,627,316 | 12/1971 | Machinski | 273/1 M |

*Primary Examiner*—Louis G. Mancene
*Attorney, Agent, or Firm*—Arthur Schwartz

[57] ABSTRACT

A fishing pole for use in a children's game has a line extending through the rod and handle. The line may be pulled by a knob at one end of the handle or may be wound on a reel. A magnet for catching a toy "fish" is connected at the other end of the line. Associated with the magnet is a release mechanism for removing the "fish" when desired.

12 Claims, 9 Drawing Figures

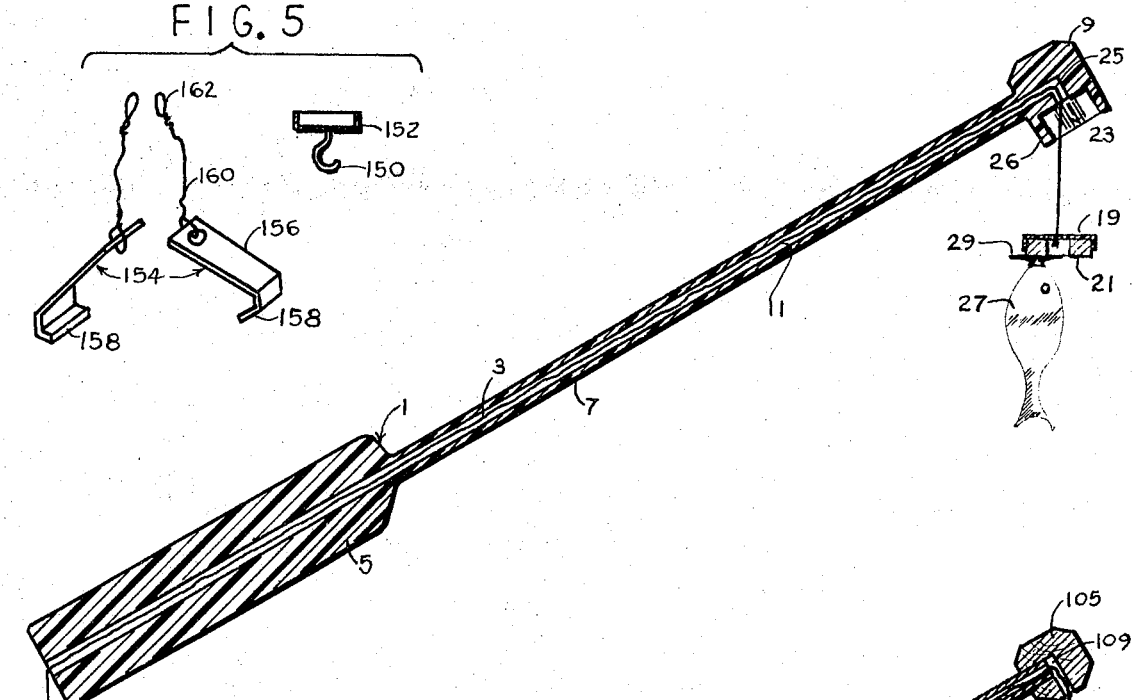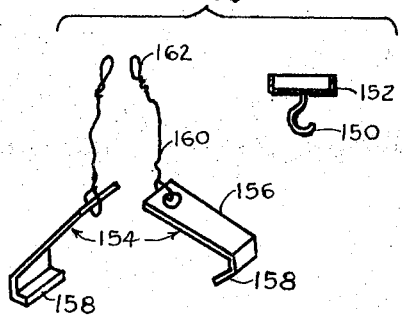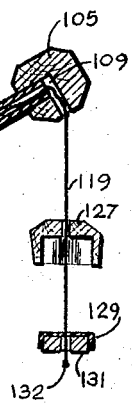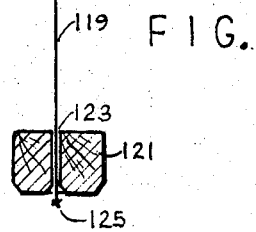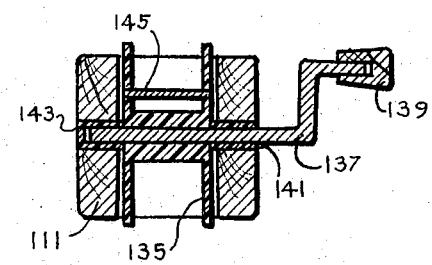

PATENTED FEB 11 1975 3,864,872

FISHING GAME

BACKGROUND OF THE INVENTION

1. Field of the Invention

The invention relates to a fishing rod which can be associated with a plurality of "fish" to form a fishing game.

2. Description of the Prior Art

Prior art children's fishing games have been for the most part unimaginative and contribute little or nothing to the development of eye-hand coordination and manual dexterity. They have essentially included merely a rod with a string affixed to one end. Alternatively, they have had wind-up reels such as U.S. Pat. Nos. 2,408,141 and 2,598,487.

It is customary in the prior art devices to utilize a magnet on the end of the line for catching a "fish." When the "fish" is caught, the child either raises the fixed-line type or reels in the conventional fishing reel type. Alternatively, such prior art devices as illustrated in U.S. Pat. No. 1,640,259 generate a signal when a "fish" is caught by connecting a line through the center of a rod to a switch mechanism.

OBJECTS AND SUMMARY

It is an object of the instant invention to provide a fishing rod assembly for picking up objects which will contribute to the development of eye-hand coordination and manual dexterity.

It is another object of the invention to provide a children's fishing game which will permit the easy removal of the "fish" from a magnetic "hook."

A further object is to provide a fishing rod with the line passing through the center of the rod and cooperating with a pull-knob at the other end for raising the caught "fish."

Still another object is to provide multiple means for raising the "fish." These multiple means include a somewhat conventional reel and a pull-knob associated with a line passing through the hollow portion of the rod.

Another object of the invention is to provide multiple line rods so that more than one "fish" can be caught or a pair of lines can be utilized concurrently and/or cooperatively to retrieve one elongated member.

In one form of the invention a hollow handle and rod has a line passing therethrough. A pull-knob is positioned at one end of the line and a magnet with an associated release mechanism is attached to the other end. In another modification a reel assembly is positioned in the handle whereby the child can select either the winding method or the pull-knob method. Other modifications utilize a plurality of rod and line elements wherein the child can either catch "fish" successively or operate two rods cooperatively for retrieving a single object.

BRIEF DESCRIPTION OF THE DRAWINGS

The foregoing and other objects, features and advantages of the invention will become more apparent from the following detailed description and accompanying drawings wherein:

FIG. 1 is a cross-sectional view of one embodiment of the invention;

FIG. 2 is a cross-sectional of a second embodiment of the invention;

FIG. 3 is a cross-sectional view of the reel assembly of FIG. 2 taken along lines 3—3;

FIG. 4 is an exploded cross-sectional view of the reel assembly of FIG. 3;

FIG. 5 is an attachment means for use with the embodiment of FIGS. 1 and 2;

DETAILED DESCRIPTION OF THE INVENTION

Modification of FIG. 1

Figure 7:
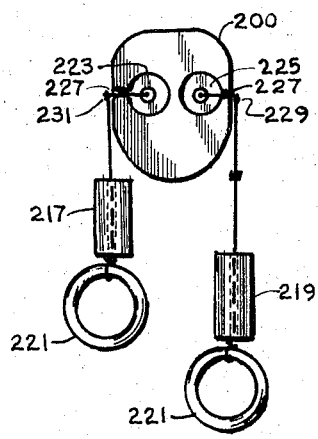
FIG. 7 is an end view of the embodiment illustrated in FIG. 6.

Referring now to FIG. 1, a one-piece rod assembly 1 preferably made of plastic material has a longitudinal bore 3 extending through a handle 5, an elongated rod element 7 and into a cup-shaped release actuator mechanism 9. Extending through the bore 3 is a line in the form of a string 11. Positioned on one end of the line 11 adjacent the end of handle 5 is a pull-knob 13. The line 11 extends through an opening 15 in the pull-knob and has a stop means in the form of a knot 17 to prevent the line from slipping through the opening 15.

At the other end of the line 11 is attached a plastic cup 19 having an annular magnet 21. The line 11 is knotted inside the cup 19 in the interior of hollow portion of magnet 21.

The release actuator cup 9 has a recess 23 therein which communicates with an extension 25 positioned at a right angle to the longitudinal bore 3.

A "fish" 27 having a metallic portion 29 thereon is seen magnetically attached to the annular magnet 21. It will be noted that the metallic portion 29 is sufficiently large so as to extend beyond the edge of magnet 21 and cup In operation, the line 11 is strung through the bore 3 of the rod and handle and then through opening 15 in the pull-knob 13. The knot 17 is tied in the line to couple the pull-knob to the rod handle. The other end of line 11 which extends out through the cup-shaped release actuator 9 is strung through the opening in the plastic cup 19 and knotted therein.

The pull-knob 13 is allowed to move against the end of handle 5 as the magnet 21 and associated parts are allowed to extend downwardly. When the magnet "catches a fish" 27 by attracting the metallic portion such as 29 to the magnet, the pull-knob 13 is used to draw the line 11 through the rod. When the plastic cup 19 reaches the interior 23 of the release actuator mechanism, the plunger will push the "fish" off the end of the magnet.

Modification of FIGS. 2–4

Referring now to FIGS. 2–4, a combined pull-type and reel-type mechanism is illustrated. An assembly 101 has a rod 103 which is made of metal and may be threaded at each end. A wood safety cup 105 is threaded to one end of the rod 103. The rod 103 has a bore portion 107 which communicates with a bore portion 109 in the safety cup 105. The other end of rod 103 is threadably secured to a handle 111, also preferably made of wood. The handle 111 has a first bore portion 113 cooperating with the bore 107 in rod 103 and a second bore portion 115 at its rearward end. Between the two bore portions 113 and 115 is a reel assembly 117.

A line 19 extends through the handle and rod assembly as does line 11 in the modification illustrated in FIG. 1. At the handle end of the line, a pull-knob 121 is slid over the line 119 through an opening 123 and knotted at 125. The other end of the line is passed through a floating release cup 127 and through a plastic cup 129 having a magnet 131 secured therein. The line 119 is knotted at 132 to prevent the magnet assembly from being removed.

The reel as seen in FIGS. 3 and 4 has a reel assembly 135 positioned in the handle 111. A crank 137 having a knob 139 at one end thereof is slid through a sleeve 141 in the wood handle and into the center of the reel. An end cap 143 is positioned over the crank 137 in the side of the handle opposite the sleeve 141. A dowel 145 is inserted in a pair of openings 147 in the outside surfaces of the reel. The end cap and sleeve are preferably made of plastic, and the crank is slip-fitted in the cap and sleeve.

In operation, the pull-knob 121 can be used in the same manner as that described relative to knob 13 in FIG. 1. When the knob is pulled all the way through to its lowermost extended position and a "fish" is attached to the magnet, the magnet 131 and cup 129 will be pulled against the release cup 127 which in turn will be pulled all the way up to the opening 109 in the safety cap 105. The outer periphery of the cup 127 will extend over the magnet 131 thus pushing the "fish" off the end of the magnet.

To further develop the manual dexterity of the child, the reel mechanism can be used to wind the magnet in and out rather than using the pull-knob 121. As the crank 137 is rotated, the line 119 will wind around the center portion of the reel and the dowel 145 to effect the reeling and unreeling of the line.

Attachment illustrated in FIG. 5

FIG. 5 illustrates a hook 150 connected to a metal cup 152 which is adapted to be held by the magnet 21 or 131 of FIGS. 1 and 2 respectively. A pair of tongs 154 having a shank 156 and a hook-shaped portion 158 are adapted to be used to pick up small flat objects. A pair of strings 160 with loops 162 therein are then used in conjunction with the hook 150 to pick up the flat member which has been positioned within the tongs. The child will first place the hook and cup 150, 152 on the magnet and then will pass the hook through each of the loops 162. He will then place the tongs on opposite sides of the object to be moved. The object must be balanced on the tongs. He will then try to raise the object and place it in a new position on a toy such as a building roof.

Figure 6:
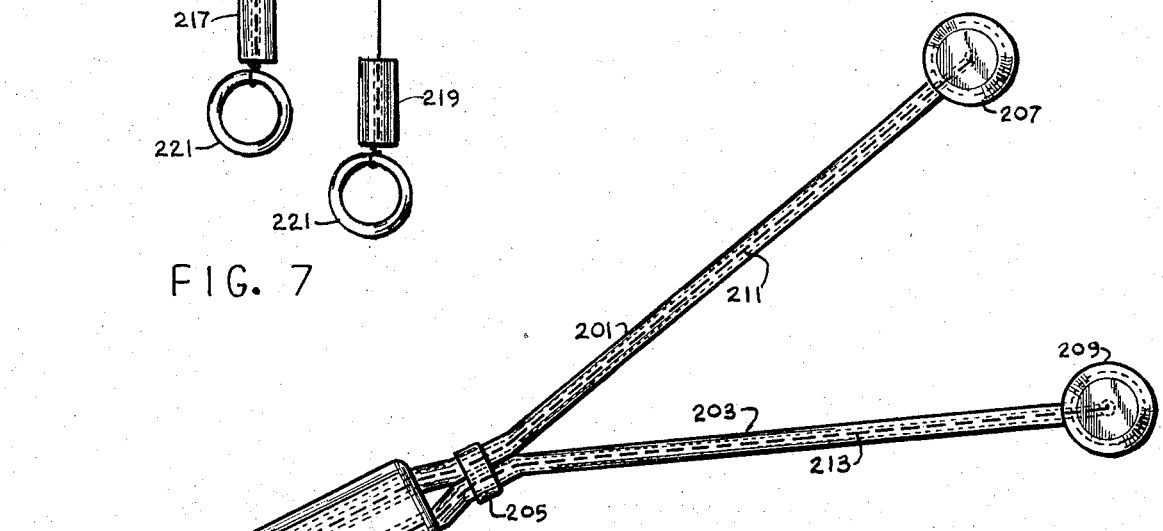
FIG. 6 is a top plan view of a third embodiment of the invention.

Modification of FIGS. 6 and 7

Referring now to FIGS. 6 and 7 a handle 200 is seen with a pair of metal rods 201 and 203 extending therethrough. The rods are clamped together by a binder 205 diverging outwardly and include a pair of cup-shaped release actuators 207 and 209. These are of the type illustrated in FIG. 1 and include the similar type of release mechanism. Obviously, an arrangement such as seen at 105 and 127–132 in FIG. 2 is also feasible with this modification. A line 211 is positioned in rod 201 as is a line 213 in rod 203. Positioned at the end of the handle 200 is a pull-knob 215 having a pair of sliding guide members 217 and 219 associated with lines 211 and 213 respectively. Attached to the lines are rings 221 which are used for pulling the respective lines and for preventing the lines from passing through the sleeves 217 and 219. The sleeves 217 and 219 fit in recessed openings 223 and 225 in the pull-knob 215.

It will be appreciated that the lines 211 and 213 together with their corresponding magnet assemblies can be pulled simultaneously by means of the pull-knob 215. Alternatively, the individual lines can be operated by pulling individually on each of the rings 221. A saw cut 227 will be seen in the end view of FIG. 7 in each of the outer sides of the recesses 223 and 225. Knots can be located at, for example, 229 and 231 so that the "fish" once it is "caught" can be held in a particular elevated position. In this manner the child can hold the handle 200 and operate first one line to catch a "fish" and then the other. The "fish" can be held in the elevated position by extending, for example, line 213 through slot 227 in such a manner that knot 229 will prevent the magnet from returning the "fish" to the "pond." While the first "fish" is maintained in the elevated position, the child can then go back and attempt to retrieve a second "fish." In this way he will be encouraged to not only use his judgement, but also a certain degree of coordination between the two rods and fishing lines.

Once both "fish" are on the lines, the child can then pull on the knob 215 all the way to its outermost position and the fish will be released by the mechanisms associated with cups 207 and 209. He also can release only one "fish" at a time by pulling each line separately to its extended position.

Figure 8:
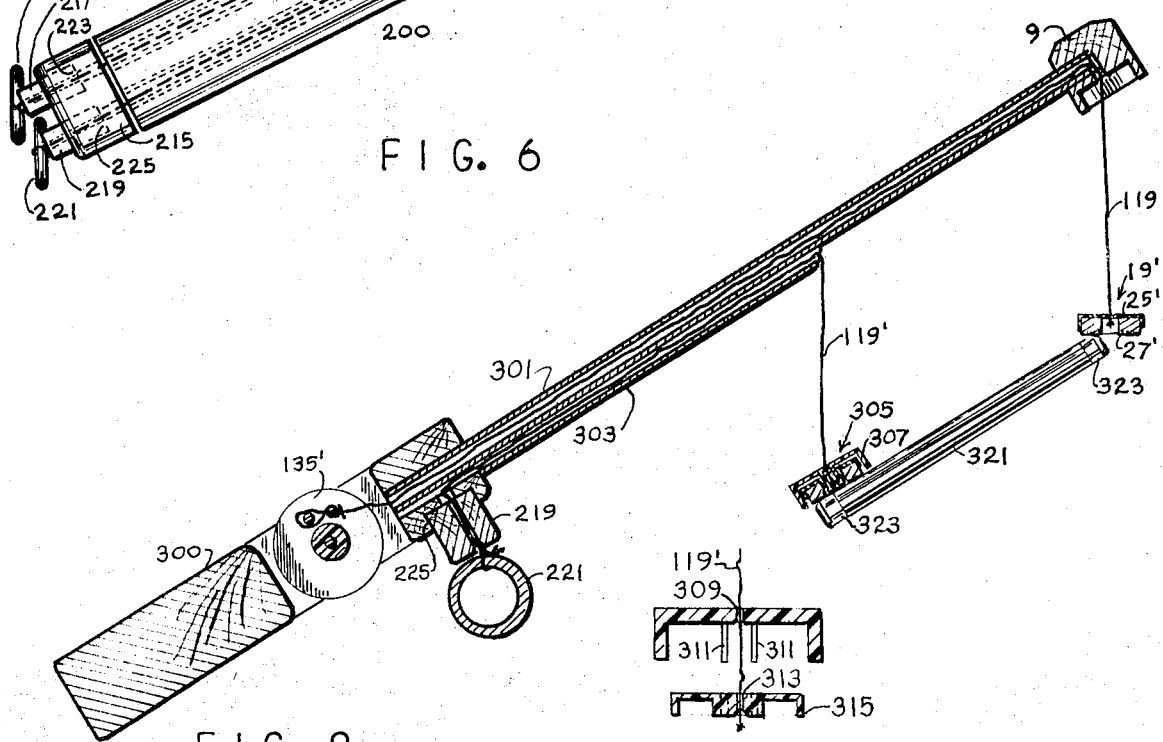
FIG. 8 is a fourth embodiment of the invention.

Modification of FIG. 8

Referring now to FIG. 8 (wherein (')s will be used to designate elements already described), a handle 300 has a reel 135' and a first rod 301 which may be adjustable and a second rod 303 connected to the handle in a manner similar to that seen in FIG. 2. In place of rod 303 a plurality of rings or eye hooks may be used. A release cup 9' and associated elements as seen in FIG. 1 will be seen, and explanation of their cooperation and operation is not felt to need further discussion.

Figure 9:
FIG. 9 is a detail of a release mechanism associated with FIG. 8.

The second rod 303 has a line 119' and associated release element 305 seen in detail in FIG. 9. The release mechanism 305 has a plastic release cup 307 with a central opening 309 to receive line 119'. Three prongs 311 spaced 120° apart slidably extend through a plurality of openings 313 in a plastic magnet support cup 315. An annular magnet 317 is positioned in the support 315, and a plastic disc 319 receives the prongs 311 to limit their movement. When the line 119 is pulled taut, the support 315 and magnet 317 are pulled fully into the release cup 307 along the prongs 311. The disc 319 rigidly attached to the prongs will push the object off the magnet.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and fall within the scope of the invention or the limits of the appended claims.

I claim:

1. A toy for picking up objects comprising:

a. a pair of rods,
b. a common handle on one end of said rods and joining said rods thereto at said one end, the other ends of said rods being slightly spaced from each other,
c. a line ppssing through each of said rods and at least a portion of said handle,
d. means on the end of each of said lines remote from said handle for picking up an object,
e. a pair of independently operable means associated with said handle and connected to respective lines for pulling each of said lines substantially through said respective rods, said pulling means being closely adjacent each other so that a child can coordinate the pulling of one line with the pulling of the other line to assist in the improvement of eye-hand cordination and manual dexterity.

2. A toy as defined in claim 1 wherein said picking means is a magnet.

3. A toy as defined in claim 2 wherein said picking-up means is a magnet and said releasing means includes means for pushing the object off the magnet.

4. A toy as defined in claim 3 wherein said magnet is reciprocally movable relative to said releasing means.

5. A toy as defined in claim 2 wherein said releasing means is cup-shaped.

6. A toy for picking up objects comprising:
a. a rod,
b. a handle on one end of said rod,
c. a line passing through said rod,
d. means associated with said handle for pulling said line substantially through said rod,
e. magnetic means on the end of said line remote from said handle for picking up an object,
f. a cup-shaped, reciprocally movable means surrounding said line and associated with said picking means for pushing the object from said picking means when said picking means substantially reaches the end of the rod remote from said handle.

7. A toy for picking up objects comprising:
a. a rod having a handle portion at one end thereof,
b. a line passing through said rod,
c. a reel means upon which said line is wound at said one end of said rod for pulling said line through said rod, said line passing over said reel and out through the end of said handle whereby said line may alternately be wound on said reel and pulled through said handle; and
d. means on the end of said line remote from said handle for picking up an object.

8. A toy as defined in claim 7 wherein said picking-up means includes a magnet.

9. A toy as defined in claim 7 including means for releasing the object from said picking-up means.

10. A toy as defined in claim 9 wherein said picking-up means is a magnet and said releasing means includes means for pushing the object off the magnet.

11. A toy as defined in claim 10 wherein said magnet is reciprocally movable relative to said releasing means.

12. A toy as defined in claim 9 wherein said releasing means is cup-shaped.

* * * * *